United States Patent
Hensel et al.

(10) Patent No.: US 12,303,893 B2
(45) Date of Patent: May 20, 2025

(54) METHOD AND APPARATUS FOR CONTROLLED PRODUCTION OF A FLUID REACTION PRODUCT

(71) Applicant: Grundfos Holding A/S, Bjerringbro (DK)

(72) Inventors: Patrick Hensel, Rheinmünster (DE); Till Hensgen, Bretten (DE); Frank Theile, Wörth am Rhein (DE)

(73) Assignee: GRUNDFOS HOLDING A/S, Bjerringbro (DK)

( * ) Notice: Subject to any disclaimer, the term of this patent is extended or adjusted under 35 U.S.C. 154(b) by 1032 days.

(21) Appl. No.: 17/123,537

(22) Filed: Dec. 16, 2020

(65) Prior Publication Data
US 2021/0187506 A1    Jun. 24, 2021

(30) Foreign Application Priority Data
Dec. 18, 2019   (EP) .................................... 19217535

(51) Int. Cl.
*B01L 3/00*       (2006.01)
*B01J 19/00*      (2006.01)

(52) U.S. Cl.
CPC ..... *B01L 3/502738* (2013.01); *B01J 19/0093* (2013.01); *B01L 2200/0621* (2013.01)

(58) Field of Classification Search
CPC ........ B01L 3/502738; B01L 2200/0621; B01J 19/0093; B01J 2204/005; B01J 4/008; B01J 2219/00164; B01J 2219/00182; B01J 19/004; B01J 14/00; B01J 19/0006; B01J 4/02; C01B 11/024
See application file for complete search history.

(56) References Cited

U.S. PATENT DOCUMENTS

| | | |
|---|---|---|
| 4,744,956 A | 5/1988 | Yant et al. |
| 2005/0152811 A1 | 7/2005 | Taylor |
| 2006/0051285 A1 | 3/2006 | Hawker et al. |
| 2011/0052480 A1 | 3/2011 | Martens et al. |
| 2011/0278173 A1 | 11/2011 | Gunzinam et al. |
| 2016/0251219 A1* | 9/2016 | Richardson ........... C01B 11/024 423/477 |

FOREIGN PATENT DOCUMENTS

DE    102008049734 A1    4/2010

* cited by examiner

*Primary Examiner* — Kaity V Chandler
(74) *Attorney, Agent, or Firm* — McGlew and Tuttle, P.C.

(57) ABSTRACT

A device and method for producing a fluid product, such as a fluid reaction product, are provided. The device includes a reaction chamber and a reception chamber and a control unit configured to control the flow of fluid into the reaction chamber through the one or more fluid connections. The device also includes a first and second amount sensor arranged to determine an amount of fluidic component(s) of the reaction chamber and reception chamber continuously or at least quasi-continuously at least during the introduction of fluidic component(s).

17 Claims, 7 Drawing Sheets

METHOD AND APPARATUS FOR CONTROLLED PRODUCTION OF A FLUID REACTION PRODUCT

FIELD OF THE INVENTION

The present invention relates to and device and method for producing a fluid product, such as a fluid reaction product. The invention includes a reaction chamber and a reception chamber and a control unit configured to control the flow of fluid into the reaction chamber through said one or more fluid connections. The invention also includes first and second amount sensor arranged to determine the amount of fluidic component(s) of the reaction chamber and reception chamber continuously or at least quasi-continuously at least during the introduction of fluidic component(s).

BACKGROUND OF THE INVENTION

Chlorine dioxide ($ClO_2$) is in some instances used to combat germs and pathogens, such as legionella in building installations, and disinfecting small cooling water systems or drinking water in water plants or industrial processes.

Production of a fluid product, such as $ClO_2$ is typically carried out in a batch production mode. In such production modes, a batch is produced and transferred to a batch tank, where after a new batch is produced and stored ready for being transferred to the batch tank when needed.

Such a process, although fully operable, may suffer from drawbacks arising from decay of the produced fluid product over time due to a prolonged consumption of the fluid product by a customer. If, as an example, a batch of fluid product is consumed during period of 1 months, the last amount consumed will have an age of 2 months, since the batch was produced for 2 months ago. The aging can be estimated from the following. At t=0, a batch is produced and transferred to a batch tank from which the fluid product is retrieved for consumption. Directly after the transfer, a new batch is produced and stored readily available to be transferred to the batch tank. Thus, the fluid product when it is transferred to the batch tank will already have aged with 1 month, and since the consumption is one batch per month, the last amount consumed will have an age of 2 months.

Although these numbers are somehow arbitrary given to show the principle and aging may be optimised based on batch sizes, the requirement as to satisfying the requirement of not running dry of fluid product, respecting that it takes time to produce a new batch and that consumption may vary over time have resulted in that the aging of the fluid product has been accepted although not desired.

US 2011/0278173 discloses an apparatus for manufacturing of fluid reaction products. The apparatus resides in level sensors allowing discrete filling levels prompting to produce a new batch immediately after a batch has been transferred to a storage.

Hence, an improved apparatus and method for producing a fluid product would be advantageous, and in particular a more efficient and/or reliable apparatus and method would be advantageous.

OBJECT OF THE INVENTION

It is a further object of the present invention to provide an alternative to the prior art.

In particular, it may be seen as an object of the present invention to provide an apparatus and/or method that solves or at least mitigate the above mentioned problems of the prior art pertaining to e.g. aging of the fluid product.

SUMMARY OF THE INVENTION

Thus, the above described object and several other objects are intended to be obtained in a first aspect of the invention by providing a device for producing a fluid product, such as a fluid reaction product, comprising:
- a reaction chamber;
- one or more fluid connections extending from an exterior of said reaction chamber and opening into said reaction chamber to introduce fluidic component(s) into the reaction chamber;
- a reception chamber;
- an activatable fluid transfer device providing a fluid connection between the reaction chamber and the reception chamber so that the reception chamber receives a fluid product produced in the reaction chamber when the fluid activatable fluid transfer device is activated;
- an activatable discharge connection for discharging fluid product from the reception chamber, a control unit configured to control the flow of fluid into the reaction chamber through said one or more fluid connections;
- a first amount sensor arranged to determine the amount of fluidic component(s) of the reaction chamber continuously or at least quasi-continuously at least during the introduction of fluidic component(s), the first amount sensor is operatively coupled to the control unit to communicate to the control unit by a sensor readout the determined amount in the reaction chamber;
- a second amount sensor arranged to determine the amount of fluid product in the reception chamber continuously or at least quasicontinuously, the second amount sensor is operatively coupled to the control unit to communicate to the control unit by a sensor readout the determined amount of fluid product in the reception chamber.

While the invention is found to be applicable for production of a fluid product in general, the preferred embodiments of the invention have in particular been found useful for production of the following fluid products:
Production of $ClO_2$, e.g. for drinking water use:
   Hydrochloric acid—Chlorite—Method:

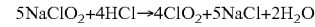
$$5NaClO_2 + 4HCl \rightarrow 4ClO_2 + 5NaCl + 2H_2O$$

Peroxydisulfate—Chlorite—Method
Production of Monochloramine ($NH_2Cl$):
   With Ammonia ($NH_3$) and Hypochlorous acid (HClO):

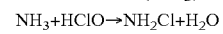
$$NH_3 + HClO \rightarrow NH_2Cl + H_2O$$

The invention has shown, compared to existing technologies, to provide an optimization of the chemical process and/or provide fluid products with flexible, such as user selected, concentrations of fluid product by means of continuous level sensors. Some examples are:
   To reduce by-products, the concentration can be decreased by decreasing the amount of fluid components within prescribed limits.
   For temporary demand of a highly-concentrated fluid product, the concentration can be increased by increasing the amount of fluid components within safe limits.

Terms used herein are used in manner being ordinary to a skilled person. However, some of the terms used are elaborated in the following:

"Continuously or at least quasi-continuously" as used herein e.g. in "a first amount sensor arranged to determine the amount of fluidic component(s) of the reaction chamber continuously or at least quasi-continuously at least during the introduction of fluidic component(s)" is typically used to reference a sensor device being capable of providing a sensor signal providing a readout of the actual amount of fluidic component(s) in reaction chamber and fluid product in the reception chamber. Accordingly, "continuous" refers to a sensor device providing a indicative of the actual content, "quasi-continuous" refers to a sensor device providing a stepwise read out with respect to actual amount, that is the actual content is between two succeeding steps, e.g. between 100 [ml] and 101 [ml].

"Hydraulic diameter" $D_h$ as used herein may preferably be determined as $D_h=4*$cross section area/length of perimeter circumscribing cross sectional area.

Control unit as used herein typically refers to a computer comprising software and interfaces configuring the computer to receive readouts from sensor and providing controlling signal to elements (pumps, valves, etc.) of the device, and to perform the determination disclosed herein.

In some preferred embodiments, the activatable fluid transfer device may comprise a pump, a valve or combinations thereof, wherein the pump, valve or combination thereof may be configured to be controlled by said control unit so that the pump, valve or combinations thereof may be activated to transfer fluid upon a receipt of a control signal provided by said control unit.

The activatable fluid transfer device may in some embodiments preferably comprises a siphon, said siphon may comprise a down pipe and a riser pipe arranged outside said down pipe, said riser pipe has an internal diameter or hydraulic diameter being larger than the outer diameter or hydraulic diameter of the down pipe to provide gap in between the down pipe and the riser pipe, said down pipe may extend vertically inside the reaction chamber from a bottom thereof and having an upper inlet opening arranged at a distance from said bottom, said riser pipe being closed at an upper end, the siphon may further comprise an opening at the lower end of said riser pipe providing fluid passage into said gap, and an opening at the upper end of said down piper between said gap and the inlet opening of the riser tube.

In some preferred embodiment, the device may further comprise, a number of chemical storage containers each being arranged in fluidic connection with the reaction chamber through said one or more fluid connections, said fluidic connection may comprise a pump, a valve or a combination thereof, wherein the pump, valve or combination thereof may be configured to be controlled by said control unit so that the pump, valve or combinations thereof may be activated to selective transfer chemical from one or more of the chemical storage containers upon a receipt of a control signal provided by said control unit.

Some preferred embodiment of the device may further comprise a gas storage, preferably being a variable volume gas storage, fluidicly connected to the interior of said reception chamber.

In some preferred embodiments, the activatable discharge connection may comprise a pump in combination with valves, said pump and valves may be configured to provide a discharge of the fluid product upon a receipt of a control signal provided by said control unit.

Preferably, the reception chamber may further comprise a closable purge connection.

In some preferred embodiments, the device may further comprise a water reservoir fluidicly connected to the reaction chamber through a pipe, preferably comprising a shut-off valve and/or a pump.

Preferably, the first and/or second amount sensor may comprise a floating gauge configured to provide an electrical signal representative of a liquid level, a weighing device configured for weighing the reaction chamber or the reception chamber and provide an electrical signal representative of the weight, an optical sensor or ultrasonic sensor configured to determine a surface level position in the reaction chamber or the reception chamber (8) and provide a signal representing the surface level position, or a pressure sensor configured to determine the fluid column pressure in the reaction chamber or the reception chamber and provide a signal representing the fluid column pressure.

The invention relates in a second aspect to a method of producing a chemical compound, such as $ClO_2$, by use of the device according to any of the preceding claims, the method comprising
  a) introducing, e.g. by use of pump, valve or a combination thereof, a selected fluidic component into the reaction chamber through one of the fluid connection (s),
  b) determining on the basis of readouts from the first amount sensor the total amount of fluidic component in the reaction chamber and continue steps a) and b) until the total amount of fluidic component introduced has reached a prescribed total amount of the fluidic component, and
  c) repeat steps a) and b) until all the required selected fluidic components have been introduced into the reaction chamber.

In some preferred embodiments, the method may further comprise during the introduction of a selected fluidic component:
  determining by use of the control unit the inflow rate of the selected fluidic component and on the basis of readouts from the first amount sensor,
  comparing the inflow rate with prescribed limits, and if the inflow rate is outside prescribed limits:
    reducing production capacity,
    adjust the inflow rate to be within prescribed limits,
    or reporting an error state.

Preferably, the prescribed limits may be chemical reaction application limits.

Preferably, the steps a) and b) may be repeated one fluidic component at a time where the steps may be repeated for one fluidic component until a total amount of said fluidic component has been introduced into the reaction chamber.

Preferably the fluid product is $ClO_2$ and the fluidic components comprises sodium chlorite ($NaClO_2$) and hydrochloric acid (HCl).

In a third aspect, the invention relates to a method of initiating production a chemical compound, such as $ClO_2$, by use of the device according to the first aspect, the method preferably comprises:
  determining a minimum threshold amount of fluid product to be present in the reception chamber,
  determining on the basis of readouts from the second amount sensor the amount of fluid product present in the reception chamber,
  initiating production of fluid product by use of the method according to the first aspect if the amount of fluid product present in the reception chamber is below the determined minimum threshold amount.

Preferably, the minimum threshold amount may be determined on the basis of historical time series of data comprising discharge amount as a function of time or determined by a user.

Preferably, the minimum threshold amount may be determined by
- estimating the time of zero amount at which the amount of fluid product in the reception chamber reaches zero, the estimation being carried out by approximating the historical time series, such as most recent historical time series, of data comprising discharge amount as function of time,
- estimating the amount of time needed to provide a specific amount of fluid product in the reaction chamber, and
- determine, by approximation said time series of data, the minimum threshold amount as the amount at which the time needed to provide a specific amount equals time before zero amount.

In some preferred embodiments, the method may further comprise determining a transfer threshold amount and activating the activatable transfer device if the amount of fluid product present in the reception chamber is below a transfer threshold amount.

Preferably, the transfer threshold amount is determined as the amount at which transfer flow rate provided by the activatable fluid transfer device prevents the amount of fluid product in the reception chamber from otherwise becoming zero.

In some preferred embodiments, the method may further comprise producing a number batches of fluid product, wherein each batch may be a one amount of fluid product produced, and for each batch produced:
- recording the inflow rate for each of the selected fluidic component,
- comparing the recorded inflow rates between batches, and
- if the compared inflow rates are not within prescribed limits, provide a report thereof to a user.

BRIEF DESCRIPTION OF THE FIGURES

The present invention and preferred embodiments of invention will now be described in more detail with regard to the accompanying figures. The figures show ways of implementing the present invention and are not to be construed as being limiting to other possible embodiments falling within the scope of the attached claim set.

DETAILED DESCRIPTION OF PREFERRED EMBODIMENTS

Figure 1:
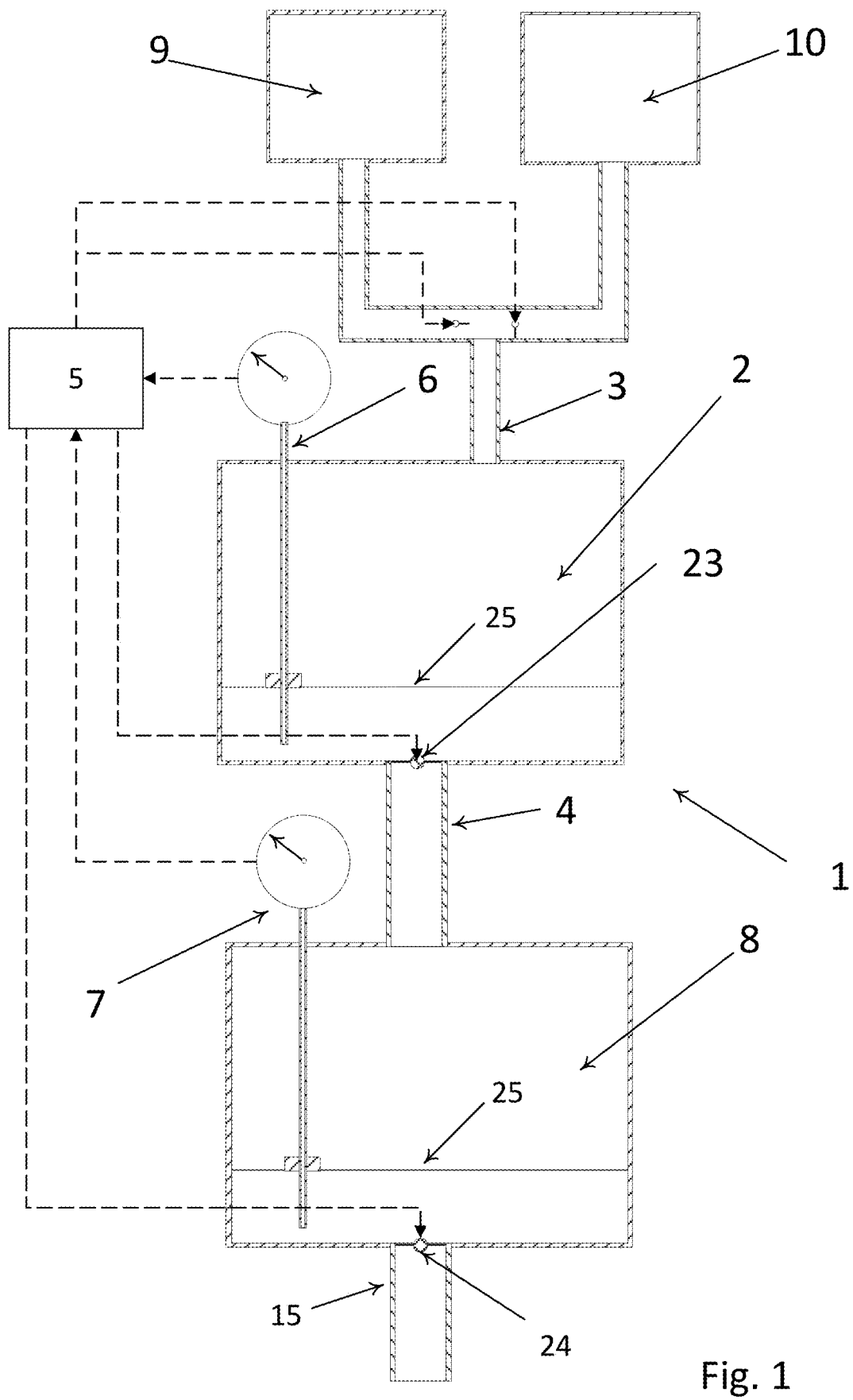
FIG. 1 is a cross sectional view of conceptual presentation of a device according to a first embodiment.

Reference is made to FIG. 1, a cross sectional view of conceptual presentation of a device according to a first embodiment of device 1 for producing a fluid product. As detailed herein the fluid product may preferably be a fluid reaction product.

In the shown embodiment, the device 1 comprises a reaction chamber 2 which is a fluid tight receptacle configured to hold a fluidic component.

A fluid connection 3 is arranged extending from an exterior of reaction chamber 2 and opening into the reaction chamber 2. The fluid connection serves the purpose of introducing fluidic components into the reaction chamber 2. In the shown embodiment, the fluid components are stored in the $1^{st}$ and $2^{nd}$ chemical storages 9, 10, which each are in the form of containers. The fluid connection 3 contains a bifurcation with valves where each of branch leads to a separate chemical storage. Opening and closing of the valves is controlled as indicated by the control unit 5.

Accordingly, by opening the valves in the fluid connection 3, fluid components can flow into the reaction chamber. Typically, the valve are opened one at a time to assure that chemical reactions takes place in the reaction chamber 2.

Although two storages 9, 10 are shown more storages can be implemented. The storages 9, 10 serves the purpose of keeping fluidic components, which when mixed results in a chemical process, separated. In other embodiments, each storage 9, 10 is individually fluidic connected with the reaction chamber 2 by a separate fluid connection 3.

A reception chamber 8 is arranged in fluid connection with the reaction chamber 2 so that fluid can flow from the reaction chamber 2 and into the reception chamber 8. The fluidic connection between the reaction chamber 2 and the reception chamber is embodied as an activatable fluid transfer device 4 providing a fluid connection between the reaction chamber 2 and the reception chamber 8 so that the reception chamber 8 receives a fluid product produced in the reaction chamber 2 when the fluid activatable fluid transfer device 4 is activated. In the shown embodiment, this is provided by a pipe connecting the reaction chamber 2 and the reception chamber 8 and a valve 23. The opening and closing of the valve 23 is controlled by the control 5 so that when the valve 23 is open fluid flows from the reaction chamber and into the reception chamber 8.

Accordingly, the production of fluid product by the disclosed device 1 comprising introducing fluid components from the storages 9, 10 into the reaction chamber 2 and allow the reaction process to be carried out. Once the reaction process has ended, the fluid product can be transferred to the reception chamber 8 by opening the valve 23.

An activatable discharge connection 15 for discharging fluid product from the reception chamber 8 is arranged at the bottom of the reception chamber 8. In the disclosed embodiment, the discharge connection comprising a pipe with a valve 24. The opening and closing of the valve 24 is controlled by the control unit 5.

In order to monitor the amount of fluids present in the reaction chamber 2 and in the reception chamber 8, amount sensors are arranged in the device 1.

As shown, a first amount sensor 6 is arranged to determine the amount of fluidic component(s) of the reaction chamber 2. The amount sensor is configured to determine the amount in the reaction chamber continuously or at least quasi-continuously and at least during the introduction of fluidic component(s). By this, amount present in the reaction chamber is known as a function of time. The first amount sensor 6 is operatively coupled to the control unit 5 to communicate to the control unit 5 by a sensor readout the determined amount in the reaction chamber 2.

A second amount sensor 7 is arranged to determine the amount of fluid product in the reception chamber 8. This second amount sensor 7 is configured to determine the amount continuously or at least quasicontinuously so that the amount present in the reception chamber 8 is known as function of time. The second amount sensor 7 is operatively coupled to the control unit 5 to communicate to the control unit 5 by a sensor readout the determined amount of fluid product in the reception chamber 8.

As will be detailed below, these amount sensors by the continuous or at least quasicontinuous nature makes it possible to timewise monitor the discharge (consume) of fluidic product from the reception chamber 8 and estimate the time when the reception chamber 8 runs dry. Based on the estimated run-dry time, it can be estimated when a new portion of the fluid product is to be produced to avoid the reception chamber 8 runs dry.

Although the fluid transfer device 4 disclosed in connection with FIG. 1, is disclosed as a pipe with a valve, the fluid transfer device 4 may be embodied in other manner, such as comprising a pump, a valve or combinations thereof. Such a pump, valve or combination thereof is(are) preferably configured to be controlled by control unit 5 so that the pump, valve or combinations thereof are activated to transfer fluid upon a receipt of a control signal provided by said control unit 5.

Figure 6:
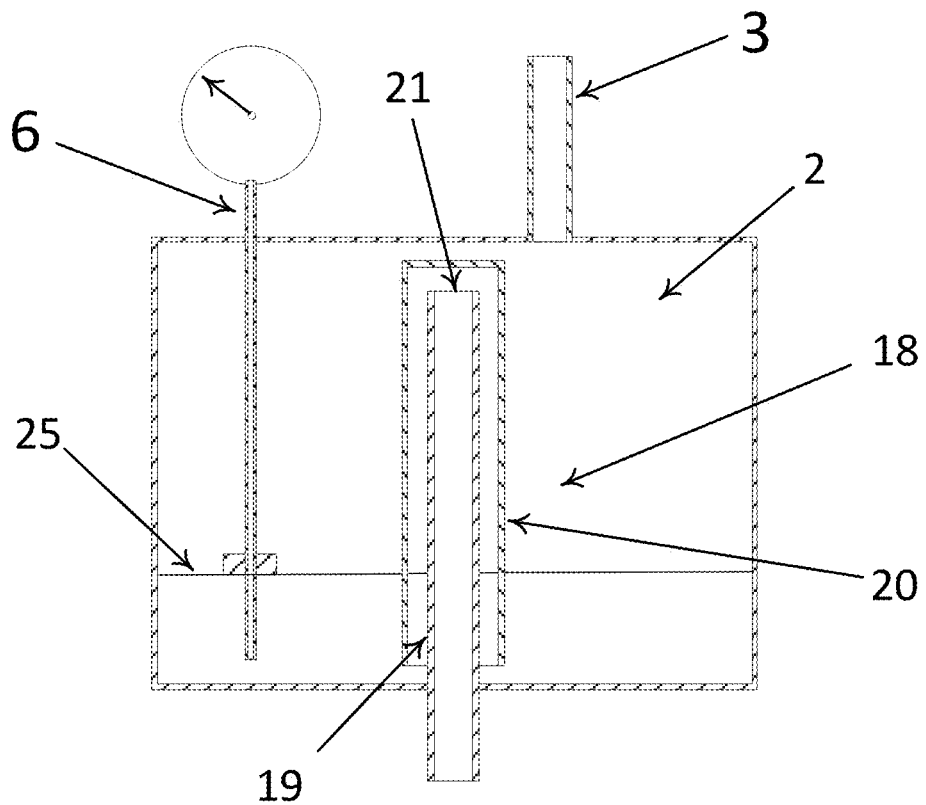
FIG. 6 is a cross sectional view of an embodiment in which the activatable transfer device is in the form of a siphon.

The activatable fluid transfer device (4) may instead of the set-up disclosed in FIG. 1 comprise a siphon 18 as shown in FIG. 6. As illustrated in FIG. 6, the siphon 18 comprises a down pipe 19 and a riser pipe 20 arranged outside down pipe 19. The down pipe 19 lead into the interior of the reception chamber 8 (not illustrated) and is sealed against the bottom of the reaction chamber 2. The riser pipe 20 is arranged inside the reaction chamber and has an internal diameter or hydraulic diameter being larger than the outer diameter or hydraulic diameter of the down pipe 19 thereby providing a gap in between the down pipe 19 and the riser pipe 20. As shown, the down pipe 19 extends vertically inside the reaction chamber 2 from a bottom thereof and having an upper inlet opening 21 arranged at a distance from said bottom. The riser pipe 20 being closed at an upper end. Due to the mutual arrangement of the riser pipe 20 and the down pipe, the siphon 18 is provided with an opening at the lower end of said riser pipe 20 providing fluid passage into said gap, and an opening at the upper end of said down pipe 19 between said gap and the inlet opening of the riser tube 20.

Figure 2:
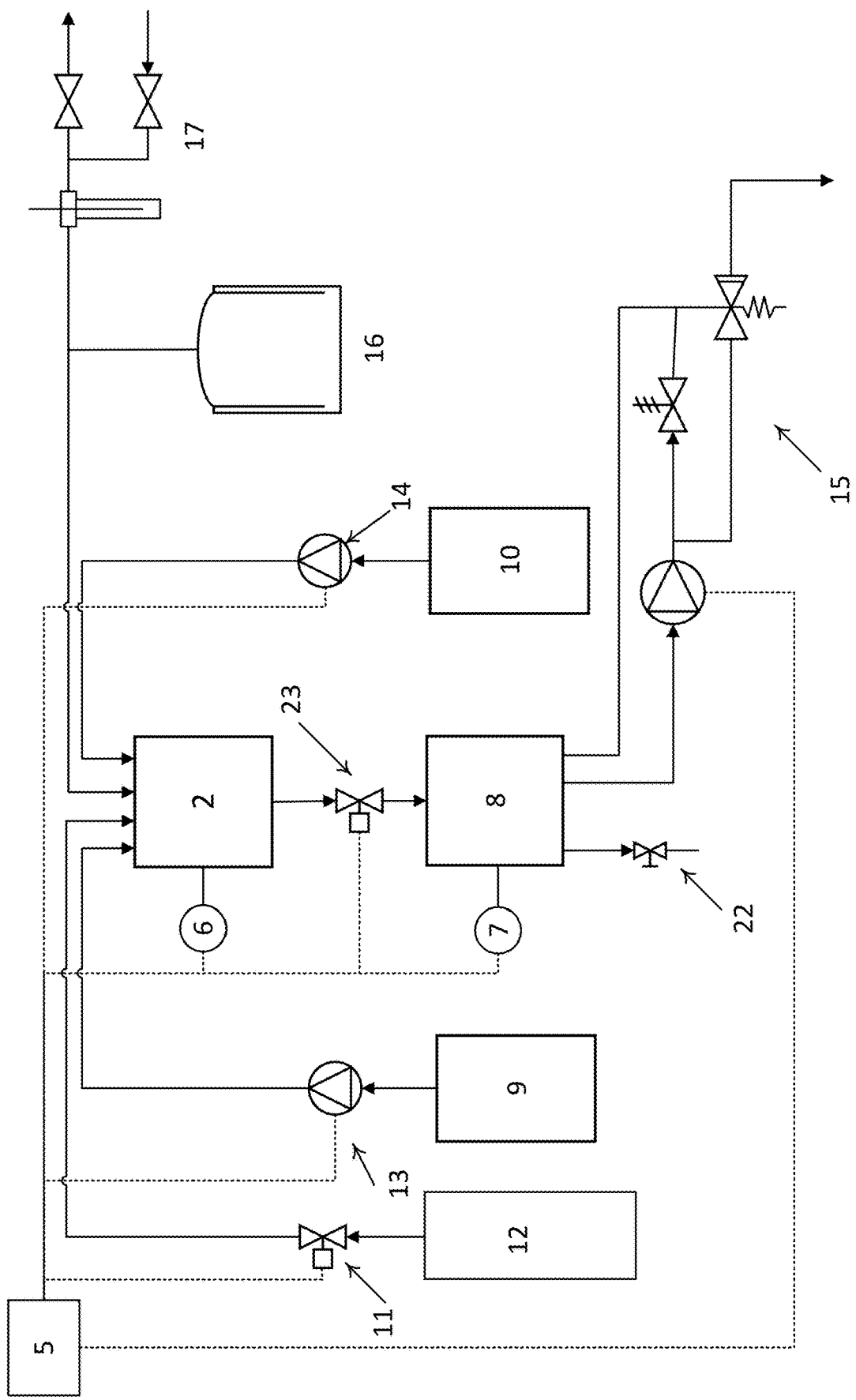
FIG. 2 is a system layout according to an embodiment of the invention.

Reference is made to FIG. 2 schematically illustrating a system layout according to an embodiment of the invention. Numerals used in connection with FIG. 1 are used for same or similar elements in FIG. 2. The device illustrated in FIG. 2 comprises a gas storage 16, preferably being a variable volume gas storage, fluidicly connected to the interior of said reaction chamber 2. By including such a gas storage, gas produced as a result of the reaction chamber 2 can be vented off and into the gas storage, which inter alia can be used to control the pressure in the reaction chamber 2, e.g. to assure that the pressure in the reaction chamber is maintained within pre-defined limits.

As also illustrated in FIG. 2, the activatable discharge connection 15 is in this embodiment provided by a pump in combination with valves. The pump and valves are configured to provide a discharge of the fluid product upon a receipt of a control signal provided by said control unit 5. The valves in the shown configuration is configured to provide safe discharge of fluid product from the reception chamber 8. Alternatively, the activatable discharge connection 15 could be controlled by an external system.

It may be desirable to be able to e.g. clean the device or discard the fluid in the reception chamber 8. To accomplish these and other purposes, the reception chamber may further comprise a closable purge connection 22. As shown in FIG. 2, such a closable purge connection 22 may be embodied as a pipe with a closable valve. By opening the valve, fluid present in the reception chamber can flow out of the reception chamber 8 through a different connection than the discharge connection 15. Cleaning may be accomplished by introducing a cleaning fluid into the reaction chamber 2 which eventually will flow to the reception chamber 8 and out through the purge connection 22.

In some situations, it is a desire to control the concentration of a chemical substance in an aqueous solution. In accordance with this, the device 1 may further comprising a water reservoir 12 fluidicly connected to the reaction chamber 2 through a pipe, preferably comprising a shut-off valve 11 and/or a pump (not illustrated). As illustrated in FIG. 2 the valve 11 and/or pump is controlled (opening and closing) by the control unit 5. It is noted that in the embodiment shown, the water is pressurised (e.g. by the water reservoir 12 being a tap water connection) whereby the flow can be controlled by the valve 11. In case water is to be pumped into the reaction chamber 2, a pump can be added to the serve this purpose.

In the embodiment shown in FIG. 1, the first and second amount sensors 6, 7 comprising a floating gauge. The floating gauges comprising a floating element which due to buoyancy float on the surface of the liquid in the reaction chamber 2 and in the reception chamber 8. The floating elements are each arranged on a rod as illustrated extending towards or even to the bottom of each of the reaction chamber 2 and the reception chamber 8. Thus, the floating elements follows with the gradually increasing/decreasing fluid level in the chambers 2, 8. In one implementation the floating elements provides an electrical connection between two conductive element extending along the rod, so that the electrical resistance is a function of the position of the floating element relatively to the longitudinal extension of the rod. Thus, the floating gauges are configured to provide an electrical signal representative of a liquid (fluid) level by measuring the electrical resistance.

The first and second amount sensor 6, 7 may alternatively or combination with the above disclosed be implemented as a weighing device configured for weighing the reaction chamber 2 or the reception chamber 8 and provide an electrical signal representative of the weight, an optical sensor or ultrasonic sensor configured to determine a surface level position in the reaction chamber 2 or the reception chamber 8 and provide a signal representing the surface level position, or a pressure sensor configured to determine the fluid column pressure in the reaction chamber 2 or the reception chamber 8 and provide a signal representing the fluid column pressure.

While the above description has been made with a focus on the hardware, the invention also relates to a method of producing a chemical compound, such as $ClO_2$, by use of a device according to the invention. The method aims at providing a production wherein the age of the produced fluid product is reduced, but as will be detailed in the following, the method aspect of the invention also has some other production benefits, e.g. pertaining to diagnosing production, such as fault diagnosing.

Figure 3:
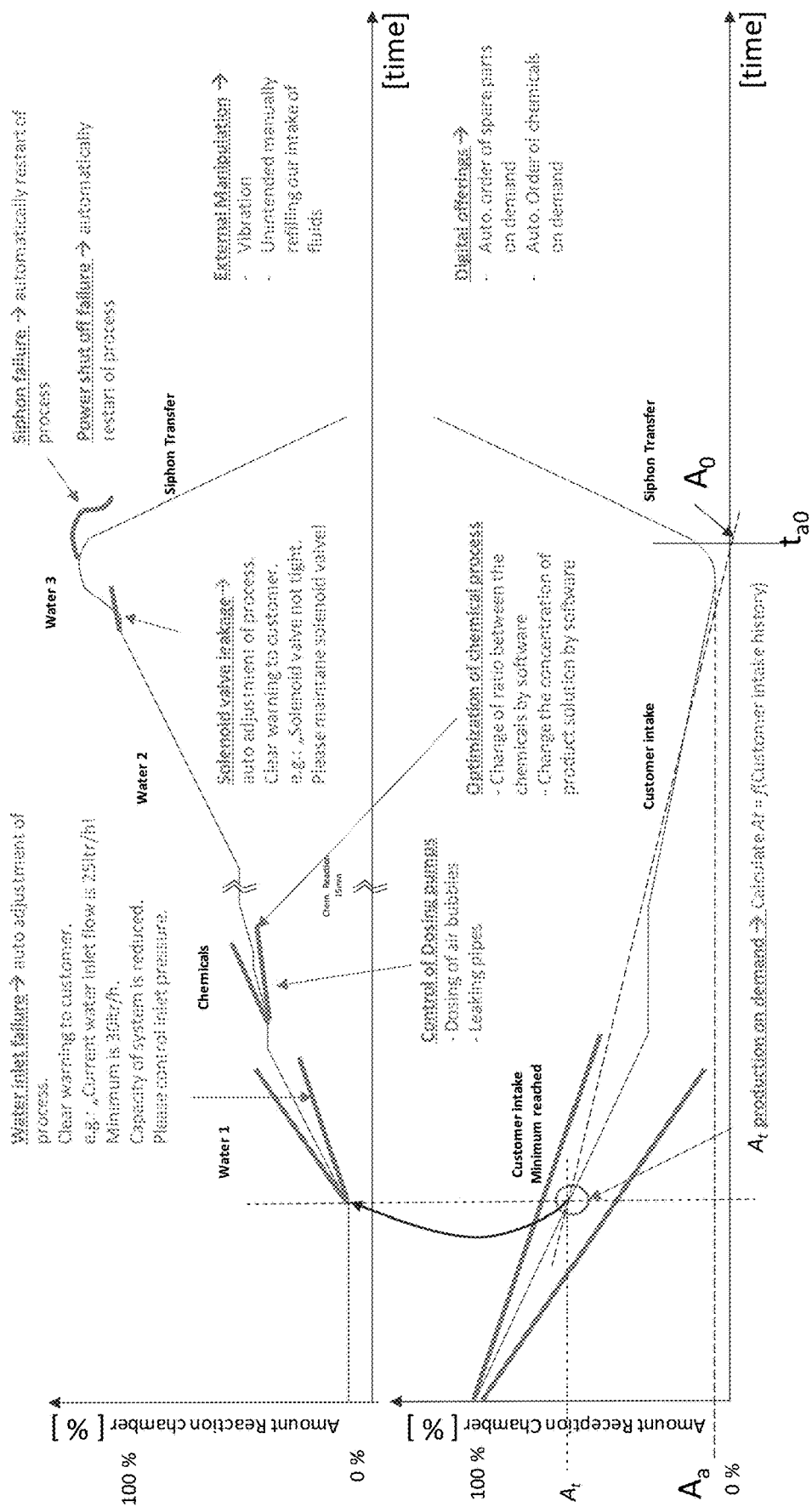
FIG. 3 is graph schematically illustrating various detection possibilities according to preferred embodiments of the invention.

As presented in FIG. 3, the method may comprise the steps of introducing sequentially water, chemical and water. Since the amount sensor determines the amounts introduced in a continuous or at least quasicontinuous manner, the flow rate fluid into the reaction chamber can be determined. In some embodiments, the method makes use of pre-determined limits on the flow rate for e.g. the water intake if as shown in FIG. 3, water inlet failure can be detected if the flow rate falls outside the pre-determined limit. FIG. 3 also show other measures than can be implement according to the invention and such measures will be disclosed in the following.

Before detailing such measure, the method may be summarized as comprising the step of:
a) introducing, e.g. by use of pump, valve or a combination thereof, a selected fluidic component into the reaction chamber 2 through one of the fluid connection(s) 3,
b) determining on the basis of readouts from the first amount sensor 6 the total amount of fluidic component in the reaction chamber 2 and continue steps a) and b) until the total amount of fluidic component introduced has reached a prescribed total amount of the fluidic component, and
c) repeat steps a) and b) until all the required selected fluidic components have been introduced into the reaction chamber 2.

By these steps, the desired fluidic components are introduced into the reaction chamber in the desired amounts and an reaction and the fluid component may be provided in the reaction chamber 2.

In order to supervise the introduction of fluid component and thereby at least indirectly supervise the production of fluid product, the method may make use of the following further steps executed during the introduction of a selected fluidic component:
determining by use of the control unit 5 the inflow rate of the selected fluidic component and on the basis of readouts from the first amount sensor 6,
comparing the inflow rate with prescribed limits, and if the inflow rate is outside prescribed limits:
reducing production capacity,
adjust the inflow rate to be within prescribed limits, or reporting an error state.

In some embodiments, a lower inflow rate does not change e.g. a chemical reaction and in such cases, the production capacity of the device can be set to be lower. In other embodiments, it is of importance for the quality of the fluid product that e.g. chemical constituents are available in the correct amounts during the production and in such cases the prescribed limits are chemical reaction application limits, setting limits for e.g. a minimum flow rate of chemical into the reaction chamber.

It is sometimes preferred that fluidic component is introduced into the reaction chamber 2 at a time and in such situations, steps a) and b) are repeated one fluidic component at a time where the steps are repeated for one fluidic component until a total amount of said fluidic component has been introduced into the reaction chamber 2. It is noted that one fluid component in this regard may be considered a mix of two or more fluid components. The latter may be used in case two or more fluid components can be introduced at the same time without severely jeopardizing the final product. In such situations, the two or more fluid component may be stored in separate storage containers and introduced into the reaction chamber at the same time.

In the embodiment shown in FIG. 3, the fluid product is $ClO_2$ and the fluidic components comprises sodium chlorite ($NaClO_2$) and hydrochloric acid (HCl), but the content of FIG. 3 may be generalized to other fluid products.

With specific reference to FIG. 3, a method of initiating production a chemical compound, such as $ClO_2$, will be disclosed. It noted that FIG. 3 contains an upper part illustrating the content in the reaction chamber 2 as function of time and a lower part illustrating the content in the reception chamber 8 as a function of time. As also illustrated the content in the reaction chamber is zero until a customer intake minimum is reached and at this time production of the fluid product is initiated. In FIG. 3, a thin unbroken line illustrates an amount and a thick unbroken line indicates an upper or lower limit in which the amount as function of time desirable should be within. Dotted lines are assisting lines. The specific examples makes use of the siphon (as disclosed in connection with FIG. 6), hence the transfer from reaction chamber 2 to reception chamber 8 is labelled "Siphon Transfer". As also indicated in FIG. 3, once the siphon effect is initiated no more water (or fluid) is added to the reaction chamber as the siphon is a self-propelled process. It is furthermore, noted that the amounts are given in percentage of the full amount to be present in the chamber; however, other units such as ml, kg could equally well be used.

The method of initiating a production of a chemical compound typically involves the following steps:
determining a minimum threshold amount, $A_t$, of fluid product to be present in the reception chamber 8,
determining on the basis of readouts from the second amount sensor 7 the amount of fluid product present in the reception chamber 8,
initiating production of fluid product by use of the method disclosed above if the amount of fluid product present in the reception chamber 8 is below the determined minimum threshold amount $A_t$.

This is illustrated in FIG. 3 where the minimum threshold amount $A_t$ is shown in the lower graph of FIG. 3 and being labelled "Customer Minimum reached"

The minimum threshold amount may be determined in numereous manner, and in some embodiments, the minimum threshold amount $A_t$ is determined on the basis of historical time series of data comprising discharge amount as a function of time or determined by a user. In the first instance (historical time series) an estimation on when the reception chamber runs dry (0% in the lower graph of FIG. 3) is made and in the latter case (determined by a user), the minimum threshold amount $A_t$ may be set in accordance with a user's desire as to minimum available amount.

The historical time series of data may be the most recent time series, such as the data on discharge amount as function of time in a most recent discharge period, where a discharge period is considered to be the time period counted from latest filling of the reception chamber to 100% and to the reception chamber reached a transfer threshold $A_a$ (will be detailed below). If it can be accepted that the reception chamber runs dry (0%) the time period considered can be extended from transfer threshold $A_a$ to time at 0%. If a higher degrees on statistical accuracy is aimed at further time periods than the most recent can be used and averaged.

In a practical implementation, this can be implemented as:

$$\text{Amount in reception chamber} = -\alpha * \text{time} + \beta$$

where $\alpha$ is an estimated slope, and)
$\beta$ is the full amount in reception chamber The historical data is used to estimate α. While this represent a linear approximation a higher order approximation may be used.

Another parameter used in the determination of the minimum threshold amount $A_t$ is the time needed to produce the chemical compound (production time $t_P$). This time is typically well known due to chemical and system constraints, although deviancies may occur.

Thus, once α is determined, the minimum threshold amount can be determined by solving the above equation for:

$$A_t = -\alpha^*(t_{total} - t_P) + \beta$$

where $t_{total}$ is the above disclose time span of the discharge period.

If the time needed to produce the chemical compound $t_P$ is not available, a preselected production time can be used. Such a preselected production time could be selected by a user during set-up of the routine as a time period being sufficiently long to make it certain a real production time is less than the preselected production time.

Accordingly and with reference to FIG. 3, the minimum threshold amount $A_t$ is in the shown embodiment determined by estimating the time of zero amount $t_{40}$, that is, determining at which point in time the amount of fluid product in the reception chamber 8 reaches zero (0%). While this represents a prediction and the actual point in time can be difficult to predict, it has shown in connection with the present invention that the estimation of the point in time of zero amount may effectively be carried out by an approximation based on the historical time series of data comprising discharge amount as function of time. In such embodiments, the approximation follows a similar procedure as outlined above with respect to the linear approximation. However, once can use as the most recent historical data being data obtained since the latest filling of the reception chamber 8.

As outlined above, the method often requires the step of estimating the amount of time needed to provide a specific amount of fluid product in the reception chamber 8, that is the production time $t_P$. And based thereon, determine, by approximating said historical time series of data, the minimum threshold amount $A_t$ as the amount at which the time needed to provide a specific amount $t_P$ equals time before zero amount ($t_{40}$), as illustrated in FIG. 3.

In cases where run dry of the reception chamber 8 is not desirable, the production and/or transfer from reaction chamber 2 to reception chamber 8 is timewise adjusted based on a determined transfer threshold amount $A_a$. In such embodiments, a transfer threshold amount $A_a$ is determined and the activatable transfer device 4 is activated, if (and when) the amount of fluid product present in the reception chamber 8 is below a transfer threshold amount $A_a$.

To avoid the reception chamber 8 to run dry, it may be required to take into account the transfer flow rate between the reaction chamber 2 and the reception chamber 8, which is in particular the case when a siphon is used since such a siphon requires further water/fluid to be added to the reaction chamber 2 in order to initiate the transfer. However, when the transfer threshold is considered, the production is assumed to have been completed. The transfer threshold amount $A_a$ is determined as the amount at which transfer flow rate provided by the activatable fluid transfer device prevents the amount of fluid product in the reception chamber from otherwise becoming zero as illustrated in FIG. 3.

When the device and method are in use, a number of batches are typically produced wherein each of such batches is a one amount of fluid product produced.

In accordance with the invention, the following may advantageously be implemented. The inflow rate for each of the selected fluidic component is recorded, comparing the recorded inflow rates between batches produced, and if the compared inflow rates are not within prescribed limits, provide a report thereof to a user. Such limits are indicated by the thick solid lines in FIG. 3. This procedure can be used to assure correctly operation of the method and device.

For instance, if the water intake to the reaction chamber is lower than the limit, this is often a sign on water inlet failure (see notes in FIG. 3 pertaining to "Water 1") As indicated in FIG. 3, a warning is generated identifying the failure observed and, if possible, also a procedure to remedy the failure, e.g. "Please control inlet pressure". Further, if the dosing of chemicals falls below a limit, a warning is generated to user, and probable causes can be communicated, such as "Dosing of air bubbles", "Leaking pipe". Thereby, the production and consumption can be monitored and actions can be taken in case the production and consumption does not run as desired.

Further detection can be leakage detection and/or external manipulation detection. This can be identified e.g. during waiting times (e.g. reaction time or between water 2 and water 3, see FIG. 3), during which the expected inflow rate (prescribed limit) is 0 l/h and therefor the content in the reaction chamber should be constant. If it is not, a solenoid valve may be leaking, or the system was externally manipulated. This typically involves that the system report an error to user.

Another advantageous feature of the invention is that automatic restart of the process (e.g. production, transfer, discharge) after error condition can be performed. After power shut-off or an internal failure, the current state (exact levels, process step, timestamps) is known. By comparing with the pre-error state, the process can continue automatically without user intervention.

Optimization of the chemical process can be carried out since by use of the continuous level sensors, the dosing of different chemicals can be controlled to a high degree, thereby providing a flexibility with respect to varying concentration of fluid product between different batches. As examples on this can be mentioned:

1. To reduce by-products, the concentration can be decreased by decreasing the amount of fluid components within prescribed limits.
2. For temporary demand of a highly-concentrated fluid product, the concentration can be increased by increasing the amount of fluid components within safe limits.

It is noted, that although FIG. 3 present a number of warning, causes and the like, all of them don't have to be implemented. Accordingly, the invention may be designed to include one or more of those presented as well as others not presented in FIG. 3.

Figure 4:
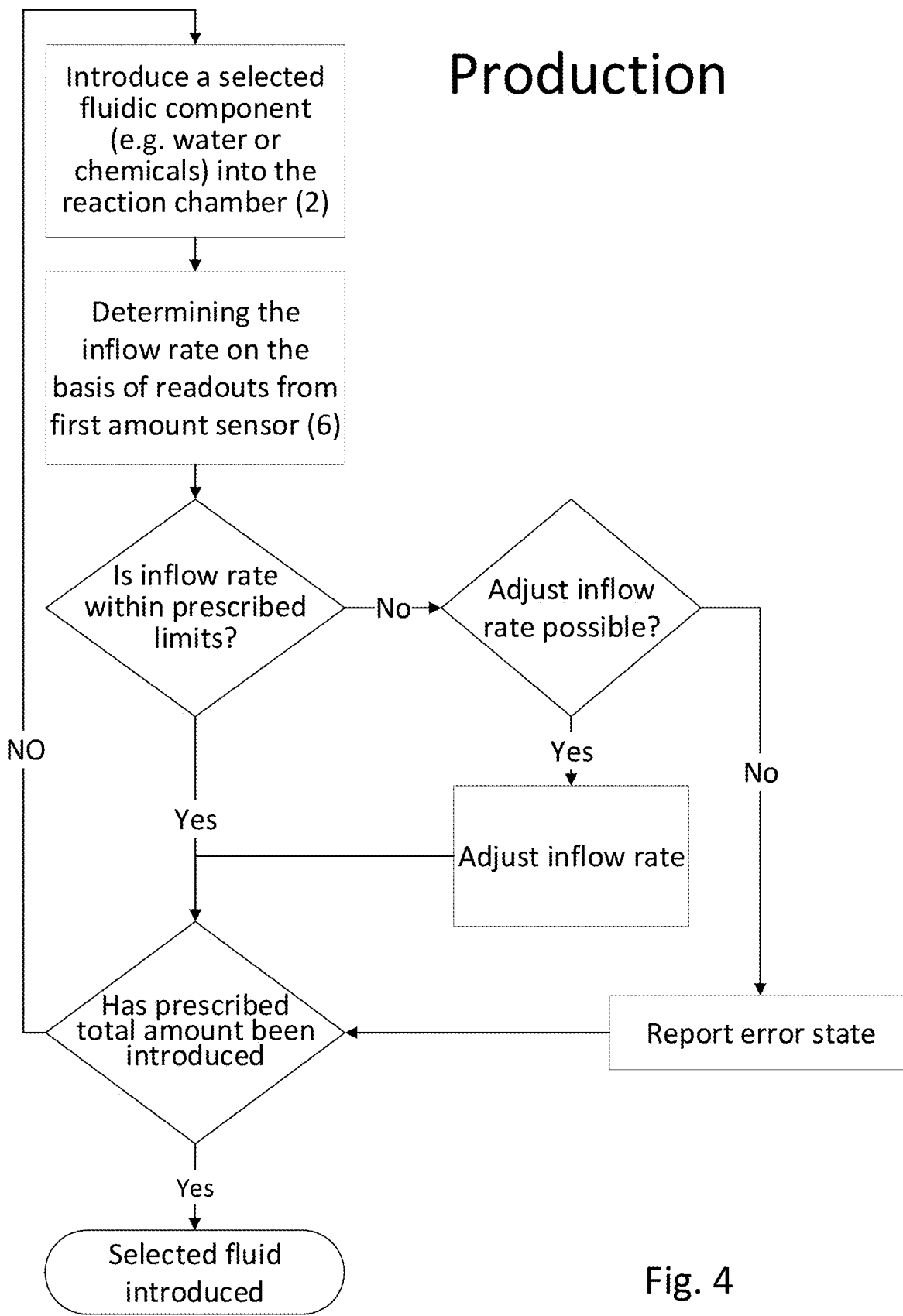
FIG. 4 is a flow chart schematically illustrating various steps performed during introduction of a fluidic component according to preferred embodiments.

FIG. 4 discloses a flow chart for a preferred embodiment of the method according to the invention detailing supervision of the production of a fluid product. As illustrated, the method determines the inflow rate into the reaction chamber 2 on the basis of readouts from the first amount sensor. Based on this, it is evaluated with the inflow rate is within prescribed limits (as detailed in relation to FIG. 3), and if not, it is decided whether the inflow rate is adjustable, typically to an extend remedying the error. This process is carried out until the total amount of the selected fluid component has been reached. Thereafter the process is carried out for another fluid component.

Figure 5:
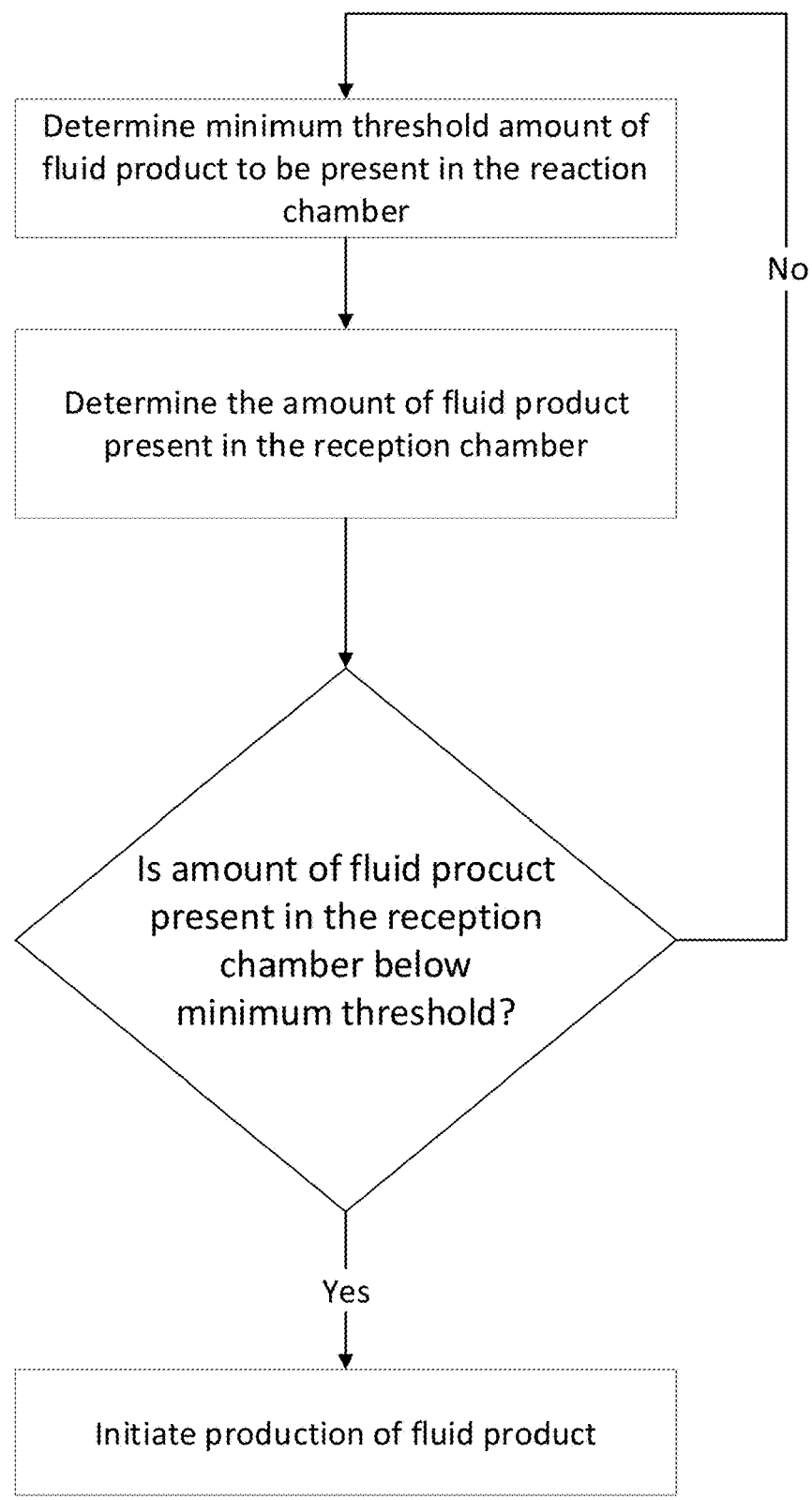
FIG. 5 is a flow chart schematically illustrating the initiation of production of a chemical compound in the reaction chamber according to a preferred embodiment.

FIG. 5 discloses a flow chart of a preferred embodiment of initiating production of a fluid product. As disclosed, the method is based on the minimum threshold amount, and the amount fluid product present in the reception chamber 8. When the amount present in the reception chamber 8 drops below the minimum threshold amount, the production of fluid product is initiated.

Figure 7:
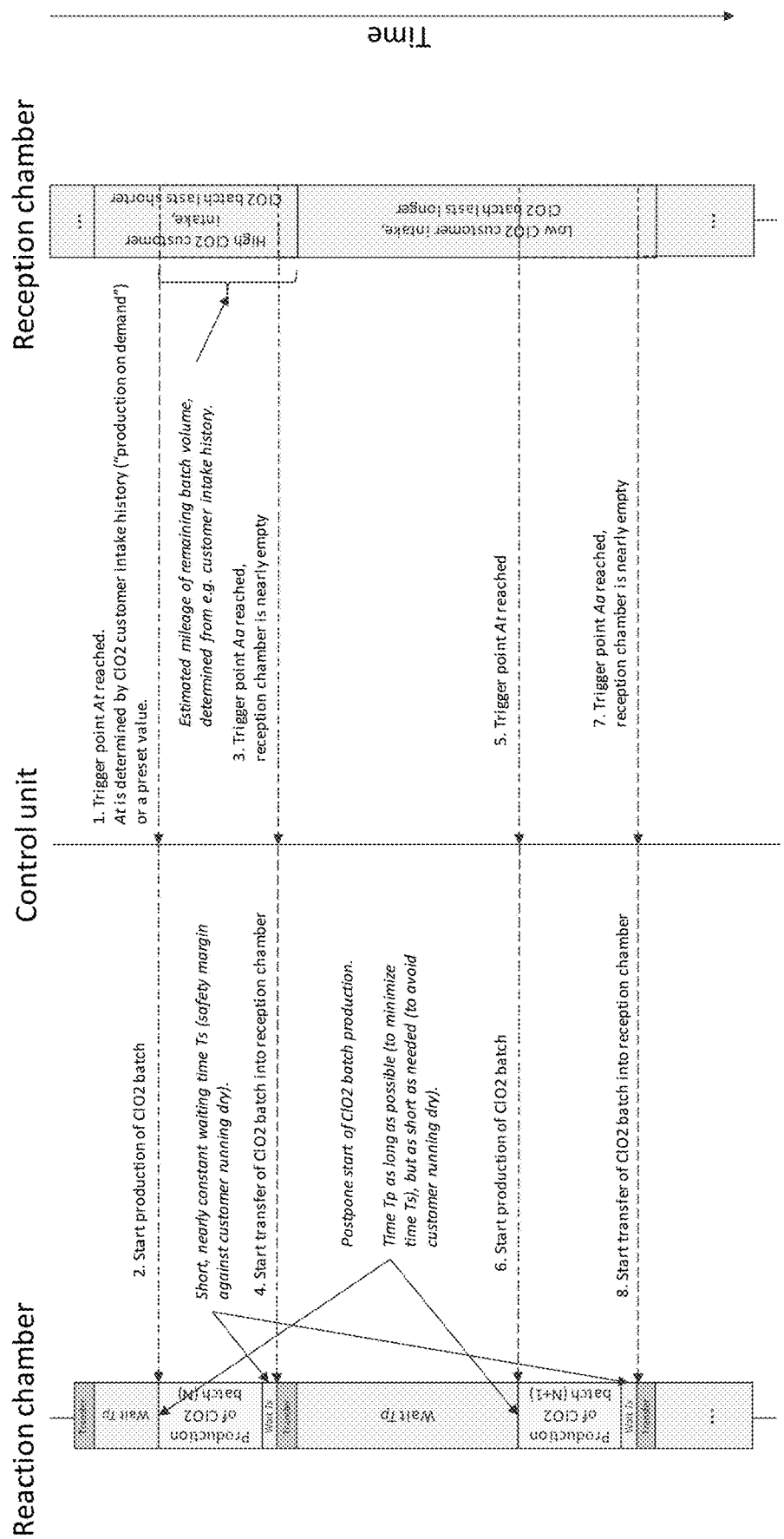
FIG. 7 is a time-chart illustrating a preferred mode of operation mode according to a preferred embodiment of the invention.

FIG. 7 discloses a time-chart illustrating a preferred mode of operation in connection with production of a $ClO_2$ batch. Left hand side of FIG. 7 refers to the reaction chamber 2 and right hand side refers to the reception chamber 8. Middle section of FIG. 7 refers to the control unit controlling the device. Arrow pointing into the control unit line indicates actions triggered by conditions in the reception chamber 8. Time axis it vertically downward in the figure. In FIG. 7 $T_p$ refers to waiting time before production is initiated and $T_s$ refers to waiting time before transfer, which time periods where no production takes place.

As shown in FIG. 7, after a transfer from reaction chamber 2 to reception chamber 8, the production is set into waiting mode which waiting mode is terminated by the threshold amount in reception chamber 8 has been reached and production of $ClO_2$ is carried out. The transfer is initiated when transfer threshold has been reached. As shown, a small waiting time for the fluid product in the reaction chamber 2 is accepted to allow the fluid product to be ready for transfer upon demand. After transfer, the production is put in waiting mode until the minimum threshold amount is reached in the reception chamber 8 where after the method is repeated.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS

1 Device for producing a fluid reaction product
2 Reaction chamber
3 Fluid connection
4 Activatable fluid transfer device
5 Control unit
6 First amount sensor
7 Second amount sensor
8 Reception chamber
9 $1^{st}$ chemical storage container
10 $2^{nd}$ chemical storage container
11 Control valve for water inlet
12 Water reservoir
13 Pump
14 Pump
15 Activatable discharge connection (valve)
16 Gas storage
17 Absorption unit
18 Siphon
19 Down pipe
20 Riser pipe
21 Upper inlet opening
22 Purge connection
23 Valve
24 Valve
25 Fluid level
$A_t$ Minimum threshold amount
$A_a$ Transfer threshold amount
$t_{ao}$ Time before zero amount
$t_{ao}$ Time before zero amount
$T_P$ Waiting time before production
$T_S$ Waiting time before transfer

The invention claimed is:

1. A method of producing a chemical compound, by use of a device comprising: a reaction chamber; one or more fluid connections extending from an exterior of said reaction chamber and opening into said reaction chamber to introduce fluidic component(s) into the reaction chamber; a reception chamber; an activatable fluid transfer device providing a fluid connection between the reaction chamber and the reception chamber so that the reception chamber receives a fluid product produced in the reaction chamber when the fluid activatable fluid transfer device is activated; an activatable discharge connection for discharging fluid product from the reception chamber; a control unit configured to control the flow of fluid into the reaction chamber through said one or more fluid connections; a first amount sensor arranged to determine the amount of fluidic component(s) of the reaction chamber continuously or at least quasi-continuously at least during the introduction of fluidic component(s), wherein the first amount sensor is operatively coupled to the control unit to communicate to the control unit by a sensor readout of the determined amount in the reaction chamber; a second amount sensor arranged to determine the amount of fluid product in the reception chamber continuously or at least quasicontinuously, wherein the second amount sensor is operatively coupled to the control unit to communicate to the control unit by a sensor readout of the determined amount of fluid product in the reception chamber, the method comprising:

determining a minimum threshold amount of fluid product to be present in the reception chamber;
determining on the basis of readouts from the second amount sensor the amount of fluid product present in the reception chamber;
a) introducing a selected fluidic component into the reaction chamber through one of the fluid connection(s),
b) determining on the basis of readouts from the first amount sensor the total amount of fluidic component in the reaction chamber and continuing steps a) and b) until the total amount of fluidic component introduced has reached a prescribed total amount of the fluidic component, and
c) repeating steps a) and b) until all the required selected fluidic components have been introduced into the reaction chamber if the amount of fluid product present in the reception chamber is below the determined minimum threshold amount, wherein the minimum threshold amount is determined on the basis of historical time series of data comprising discharge amount as a function of time.

2. A method of producing a chemical compound according to claim 1, further comprising during the introduction of a selected fluidic component:

determining by use of the control unit the inflow rate of the selected fluidic component and on the basis of readouts from the first amount sensor, comparing the inflow rate with prescribed limits, and if the inflow rate is outside prescribed limits:
reducing production capacity,
adjusting the inflow rate to be within prescribed limits, or reporting an error state.

3. A method according claim 2, wherein the prescribed limits are chemical reaction application limits.

4. A method according to claim 1, wherein the steps a) and b) are repeated one fluidic component at a time where the steps are repeated for one fluidic component until a total amount of said fluidic component has been introduced into the reaction chamber.

5. A method according to claim 1, wherein the fluid product is $ClO_2$ and the fluidic components comprises sodium chlorite ($NaClO_2$) and hydrochloric acid (HCl).

6. A method according to claim 1, wherein the minimum threshold amount is determined by:
estimating the time of zero amount at which the amount of fluid product in the reception chamber reaches zero, the estimation being carried out by approximating the historical time series, such as most recent historical time series, of data comprising discharge amount as function of time,
estimating the amount of time needed to provide a specific amount of fluid product in the reaction chamber, and
determine, by approximation said time series of data, the minimum threshold amount as the amount at which the time needed to provide a specific amount equals time before zero amount.

7. A method according to claim 1, further comprising determining a transfer threshold amount and activating the activatable transfer device if the amount of fluid product present in the reception chamber is below a transfer threshold amount.

8. A method according to claim 7, wherein the transfer threshold amount is determined as the amount at which transfer flow rate provided by the activatable fluid transfer device prevents the amount of fluid product in the reception chamber from otherwise becoming zero.

9. A method according to claim 1, further comprising producing a number batches of fluid product, wherein each batch is a one amount of fluid product produced, and for each batch produced:
recording the inflow rate for each of the selected fluidic component,
comparing the recorded inflow rates between batches, and
if the compared inflow rates are not within prescribed limits, providing a report thereof to a user.

10. A method according to claim 1, wherein the activatable fluid transfer device comprises a pump, a valve or combinations thereof, wherein the pump, valve or combination thereof is (are) configured to be controlled by said control unit so that the pump, valve or combinations thereof are activated to transfer fluid upon a receipt of a control signal provided by said control unit.

11. A method according to claim 1, wherein the activatable fluid transfer device comprises a siphon, said siphon comprises a down pipe and a riser pipe arranged outside said down pipe, said riser pipe has an internal diameter or hydraulic diameter being larger than said outer diameter or hydraulic diameter of the down pipe to provide a gap in between said down pipe and said riser pipe, said down pipe extending vertically inside said reaction chamber from a bottom thereof and having an upper inlet opening arranged at a distance from said bottom, said riser pipe being closed at an upper end, said siphon further comprising an opening at said lower end of said riser pipe providing fluid passage into said gap, and an opening at said upper end of said down piper between said gap and said inlet opening of said riser pipe.

12. A method according claim 1, further comprising a number of chemical storage containers each being arranged in fluidic connection with said reaction chamber through said one or more fluid connections, said fluidic connection comprising a pump, a valve or a combination thereof, wherein said pump, valve or combination thereof is (are) configured to be controlled by said control unit so that the pump, valve or combinations thereof (is) are activated to selective transfer chemical from one or more of the chemical storage containers upon a receipt of a control signal provided by said control unit.

13. A method according to claim 1, further comprising a gas storage fluidicly connected to said interior of said reception chamber.

14. A method according to claim 1, wherein said activatable discharge connection comprises a pump in combination with valves, said pump and valves are configured to provide a discharge of said fluid product upon a receipt of a control signal provided by said control unit.

15. A method according to claim 1, wherein said reception chamber further comprises a closable purge connection.

16. A method according to claim 1, further comprising a water reservoir fluidicly connected to said reaction chamber through a pipe.

17. A method according to claim 1, wherein first and/or second amount sensor comprising a floating gauge configured to provide an electrical signal representative of a liquid level, a weighing device configured for weighing said reaction chamber or said reception chamber and provide an electrical signal representative of said weight, an optical sensor or ultrasonic sensor configured to determine a surface level position in said reaction chamber or said reception chamber and provide a signal representing said surface level position, or a pressure sensor configured to determine said fluid column pressure in said reaction chamber or said reception chamber and provide a signal representing said fluid column pressure.

* * * * *